(12) United States Patent
Gonzalez Sanchez et al.

(10) Patent No.: US 10,623,420 B2
(45) Date of Patent: Apr. 14, 2020

(54) METHOD AND DEVICE FOR DATA INSPECTION

(71) Applicant: NEC Laboratories Europe GmbH, Heidelberg (DE)

(72) Inventors: Roberto Gonzalez Sanchez, Getafe (ES); Giulio Picierro, Velletri (IT); Giuseppe Bianchi, Rome (IT)

(73) Assignee: NEC CORPORATION, Tokyo (JP)

( * ) Notice: Subject to any disclaimer, the term of this patent is extended or adjusted under 35 U.S.C. 154(b) by 94 days.

(21) Appl. No.: 15/768,837

(22) PCT Filed: Jan. 19, 2016

(86) PCT No.: PCT/EP2016/051010
§ 371 (c)(1),
(2) Date: Apr. 17, 2018

(87) PCT Pub. No.: WO2017/125137
PCT Pub. Date: Jul. 27, 2017

(65) Prior Publication Data
US 2018/0309773 A1 Oct. 25, 2018

(51) Int. Cl.
*H04L 29/06* (2006.01)
*H04L 12/801* (2013.01)
(Continued)

(52) U.S. Cl.
CPC ...... *H04L 63/1416* (2013.01); *H04L 43/0847* (2013.01); *H04L 47/2483* (2013.01);
(Continued)

(58) Field of Classification Search
CPC ............ H04L 63/1416; H04L 47/2483; H04L 47/624; H04L 63/1425
See application file for complete search history.

(56) References Cited

U.S. PATENT DOCUMENTS 7,949,683 B2 * 5/2011 Goyal ............... G06F 16/90344
707/798
8,051,085 B1 11/2011 Srinivasan
(Continued)

FOREIGN PATENT DOCUMENTS

EP 2202937 A1 6/2010
WO WO 2015086082 A1 6/2015

OTHER PUBLICATIONS

Liu et al., A DFA with Extended Character-set for Fast Deep Packet Inspection, Sep. 2011, International Conference on Parallel Processing, pp. 1-10 (Year: 2011).*

*Primary Examiner* — Kenneth W Chang
(74) *Attorney, Agent, or Firm* — Leydig, Voit & Mayer, Ltd.

(57) ABSTRACT

A method for data inspection includes upon receiving an out-of-order part of a sequence of parts, checking the out-of-order part for matching in forward and backward direction of the sequence; temporarily saving a forward state and a backward state of said both checkings; and upon receiving an in-order part of the sequence, checking the in-order part for matching in the forward direction of the sequence and if the in-order packet is within a gap between the first part and the last part of the sequence the in-order part is also checked for matching in backward direction of the sequence. The backward state or the forward and backward state are updated or temporarily saved.

16 Claims, 5 Drawing Sheets

(51) Int. Cl.
 *H04L 12/26* (2006.01)
 *H04L 12/851* (2013.01)
 *H04L 12/863* (2013.01)

(52) U.S. Cl.
 CPC .......... *H04L 47/34* (2013.01); *H04L 47/624* (2013.01); *H04L 63/1425* (2013.01)

(56) References Cited

U.S. PATENT DOCUMENTS

| | | | | |
|---|---|---|---|---|
| 8,392,590 | B2 * | 3/2013 | Bouchard | G06F 15/7846 704/2 |
| 8,935,270 | B1 * | 1/2015 | Estan | G06F 7/02 707/758 |
| 2002/0124149 | A1 * | 9/2002 | Ni | H04L 49/103 711/170 |
| 2004/0042458 | A1 * | 3/2004 | Elzu | H04L 12/2856 370/394 |
| 2006/0198375 | A1 * | 9/2006 | Baik | H04L 63/1416 370/392 |
| 2007/0192861 | A1 * | 8/2007 | Varghese | H04L 63/1408 726/23 |
| 2008/0298369 | A1 * | 12/2008 | Elzur | H04L 12/2856 370/394 |
| 2010/0192225 | A1 * | 7/2010 | Ma | G06F 21/552 726/23 |
| 2015/0295894 | A1 | 10/2015 | Dubrovsky et al. | |

\* cited by examiner

METHOD AND DEVICE FOR DATA INSPECTION

CROSS REFERENCE TO RELATED APPLICATIONS

This application is a U.S. National Stage Application under 35 U.S.C. § 371 of International Application No. PCT/EP2016/051010 filed on Jan. 19, 2016. The International Application was published in English on Jul. 27, 2017 as WO 2017/125137 under PCT Article 21(2).

STATEMENT REGARDING FUNDING

The work leading to this invention has received funding from the European Union's Horizon 2020 Programme under grant agreement No. 644122.

FIELD

The present invention relates to a method for data inspection and further relates to a device for data inspection.

BACKGROUND

Deep packet inspection—DPI—enables analyzing the application-layer content of a packet to detect whether it contains patterns taken from a signature database, such as content strings, regular expressions, or snort-type modifiers. One issue with DPI is shown in FIG. 1 and relates to the case when patterns span over multiple packets within the same flow. Conventionally this problem is handled by (1) reconstructing the flow by reassembling consecutive packets P1-P6, so that they are in-order; and (2) applying DPI on the reconstructed stream and look for matches in the entire flow, also known as performing deep flow inspection (DFI). This enables to decouple the layer in charge of reassembling the flow with the layer in charge of running the specific DPI technique implemented. Indeed, any DPI technique can be exploited as long as it can operate on the reconstructed flow as provided by the reassembling layer. Conventional methods based on the Automate Theory show that pattern matching can be done efficiently, since the input is represented by a string of finite bytes.

However, these conventional methods have two major disadvantages which in practice make its application on large traffic volumes infeasible. First, the method requires dedicating a flow reconstruction chain, e.g., a thread in software implementations, for every flow crossing the link, thus draining computational resources. Second, the reassembling layer must explicitly maintain a state per each flow being reconstructed, thus also draining memory resources. The packets should be stored in order to complete the reconstruction phase even when the packets arrive in order. However the non-patent literature of Dharmapurikar, S., & Paxson, V, (2005, August), Robust TCP Stream Reassembly in the Presence of Adversaries, in USENIX Security shows that the number of flows with out-of-order packets is rather small—from 2 to 13%—and most of them—95-96%—have holes produced for a single out-of-order packet.

SUMMARY

In an embodiment, the present invention provides a method for data inspection, wherein data is provided in parts, wherein for inspecting the data the parts are checked upon matching one or more predefined signatures, and wherein the method is performed in a memory available to a computational device. The method includes upon receiving an out-of-order part of a sequence of parts, checking the out-of-order part for matching in a forward and in a backward direction of the sequence; temporarily saving a forward state and a backward state of the checkings; and upon receiving an in-order part of the sequence, checking the in-order part for matching in the forward direction of the sequence and if the in-order packet is within a gap between the first part and the last part of the sequence the in-order part is also checked for matching in the backward direction of the sequence. The backward state or the forward and the backward state are updated or temporarily saved.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
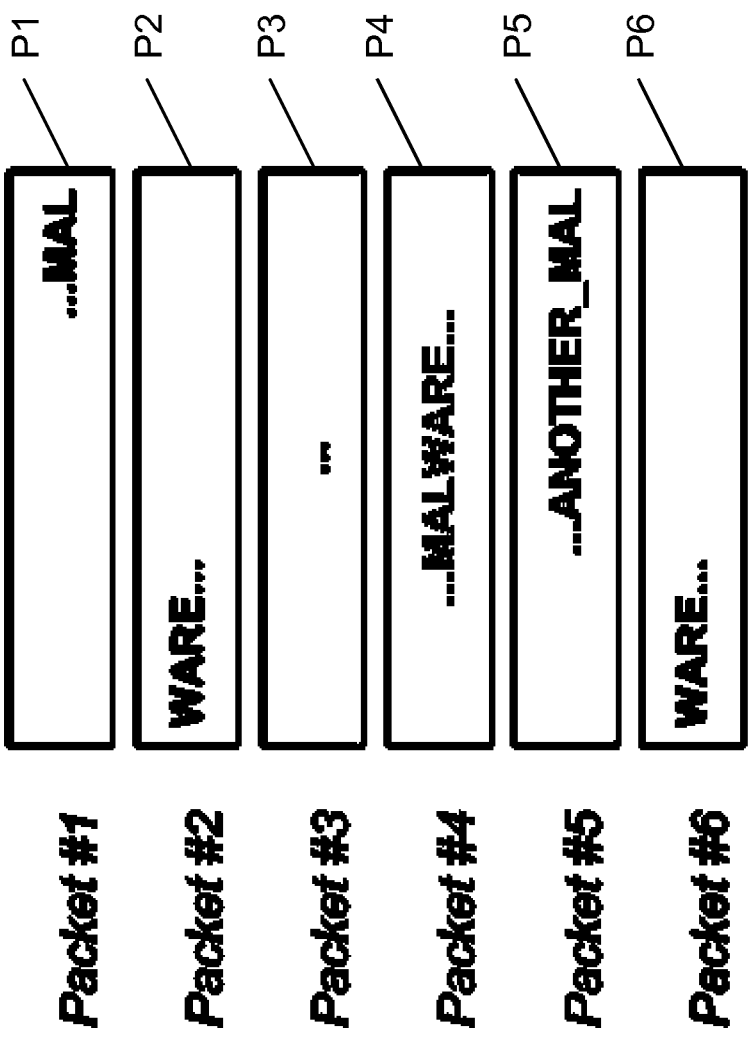
FIG. 1 shows a conventional flow comprising patterns spanning over multiple packets.

Embodiments of the present invention address the problems of avoiding the reconstruction of each flow and minimizing the amount of memory needed for performing inspection. Although generally applicable to any kind of inspection method, embodiments of the present invention will be described with regard to deep packet inspection (DPI). Furthermore, although generally applicable to any kind of data parts, embodiments of the present invention will be described with regard to flows comprising one or more packets.

In an embodiment, the present invention provides a method for data inspection, wherein said data is provided in parts, wherein for inspecting said data said parts are checked upon matching one or more predefined signatures, wherein said method being performed in a memory available to a computational device, and wherein upon receiving an out-of order part of a sequence of parts, said part is checked for matching in forward and backward direction of said sequence, and the forward state and the backward state of said both checkings are temporarily saved, and upon receiving an in-order part of said sequence said part is checked for matching in forward direction of said sequence and if said packet is within a gap between the first part and the last part of said sequence said part is also checked for matching in backward direction of said sequence, wherein said backward state or said forward and backward state are updated or temporarily saved.

In a further embodiment, the present invention provides a device for data inspection, wherein said data is provided in parts, wherein for inspecting said data said parts are checked upon matching one or more predefined signatures wherein said device is adapted to check a part upon receiving said part as an out-of order part of a sequence of parts, for matching in forward and backward direction of said sequence, and the forward state and the backward state of said both checkings are temporarily saved, and check a part upon receiving said part as an in-order part of said sequence for matching in forward direction of said sequence and if said packet is within a gap between the first part and the last part of said sequence to further check for matching in backward direction of said sequence, and to update or temporarily save said backward state or said forward and backward state.

At least one embodiment of the invention may have at least one of the following advantages: minimizing the amount of memory needed when inspecting data; handling a much larger number of flows; saving computational resources and memory consumption; and being flexible in terms of concrete implementation of the inspection method.

The term "signature" is to be understood in its broadest sense and can mean, for example, any kind of information, which can be identified or used for identification, like strings, patterns or bit-sequences.

The term "out-of-order" can mean any kind of parts out of predefined ordered parts which is not in the right order, e.g., parts that are not adjacent to each other in a sequence.

The term "gap" in connection with the term "sequence" can mean any kind of missing part or missing parts between the first part of a sequence and the last part of a sequence.

The term "state" can mean information of the result of an analysis of a part. The state can be a "forward state" or a "backward state". The term "forward state" can describe a state where a part of data is analyzed from the beginning of said part to the end of said part. A "backward state" can be a state where a part is analyzed starting from the end of said part to the beginning of said part. For example a forward state can be analyzed in the direction to higher part numbers whereas the backward state can be a result of an analysis of a part from higher part numbers to lower part numbers.

The term "part" can mean any kind of fraction of data or information, which is for instance used as a basis for transmission of data. For example parts may be packets of flows according to the OpenFlow Protocol as specified in the non-patent literature available on https://www.opennetworking.org/sdn-resources/openflow/.

Upon receiving an out-of-order part and if the size of the part is smaller than a predefined threshold, said part may be stored without checking for matching. This allows to collect a number of packets smaller than a predefined threshold without analyzing the received part immediately. Thus computational resources are saved when receiving a small packet.

Said stored part may be joined with other previously stored parts upon matching a correlation parameter. This enables to join two or more stored small parts and later perform an inspection. Thus, efficiently is increased, since after inspection and by maintaining the state, the packets can be removed from the memory or storage.

Upon receiving an in-order part, former stored parts may be checked if being a contiguous part and if yes, checking for matching in forward direction over said one or more previously stored contiguous parts may be performed. This allows to join former stored parts with in-order parts such that the former stored parts can be deleted after inspection.

If no contiguous part is stored, forward and backward state collusion may be checked. This enables whether the backward state and the forward state match and if yes, then the sequence gap is closed.

Said parts may be packets of a flow. This enables an easy implementation, for example when data transmission is performed according to the open flow transmission protocol.

Said checking and matching may be based on deterministic finite automata DFA. This enables a fast and reliable look for patterns.

A signature may be provided in form of regular expressions, for example based on a PCRE-like syntax. The term "PCRE" means Perl Compatible Regular Expressions. This enables to define signatures on a high abstraction level. Thus, easy provision of a signature is enabled.

Said regular expression may be converted to a non-deterministic finite automata and then to a deterministic finite automata. This enables to use for example a deep packet inspection engine which can be anyone of the automata theory such as the Thompson engine.

Said predefined threshold may be defined as size of said signature. This allows to detect parts being smaller than the signature size and thus to detect parts in the middle of a signature.

If said size of said signature is undefined, then the threshold may be defined depending on the application. This allows to include signatures including a wild card in regular expressions since the size of the signature is then per se undefined.

Inspecting said data may be performed by means of deep flow inspection. Using deep flow inspection allows in a reliable way an analysis on consecutive packets within the same flow.

FIG. 1 shows a conventional flow comprising patterns spanning over multiple packets. In FIG. 1 an example of possible patterns in a given flow are shown, wherein patterns span over multiple packets P1-P6 within the same flow.

FIGS. 2-5 show embodiments of the present invention.

In the following, a flow is defined as the tuple composed of the following five elements: (IP source, IP destination, PORT source, PORT destination, L4-PROTOCOL).

Further streaming DPI is performed in such a way to keep a small amount of information and two different modes of operation are described that achieve different performance levels depending in the memory footprint and can be used in different scenarios. The first method is the basis for the second one:

Basic detection (FIGS. 2 and 3): Detection of signatures that span over 2 different packets without storing any packet.

Complete detection (FIGS. 4 and 5): Detection of signatures that span over more than 2 packets with minimal packet saving.

Figure 2:
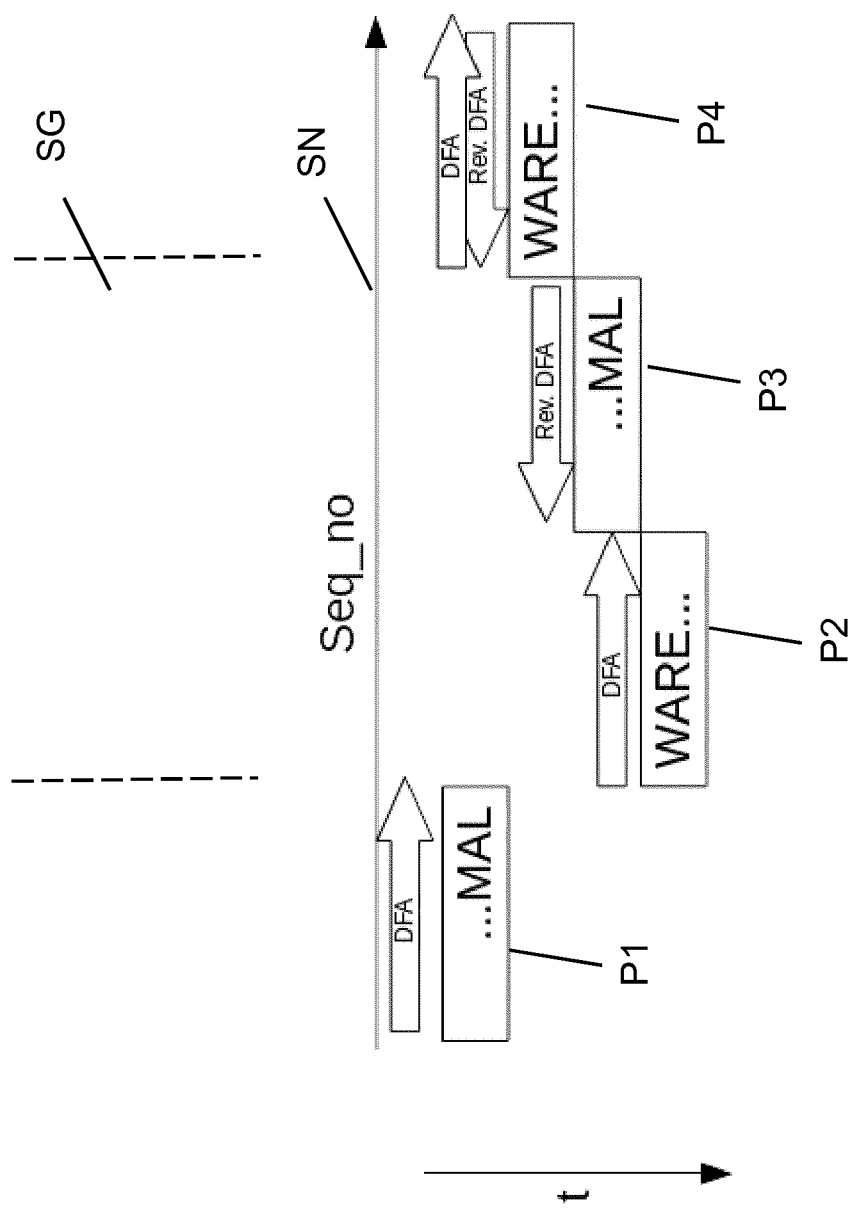
FIG. 2 shows a method according to an embodiment of the present invention.
Figure 3:
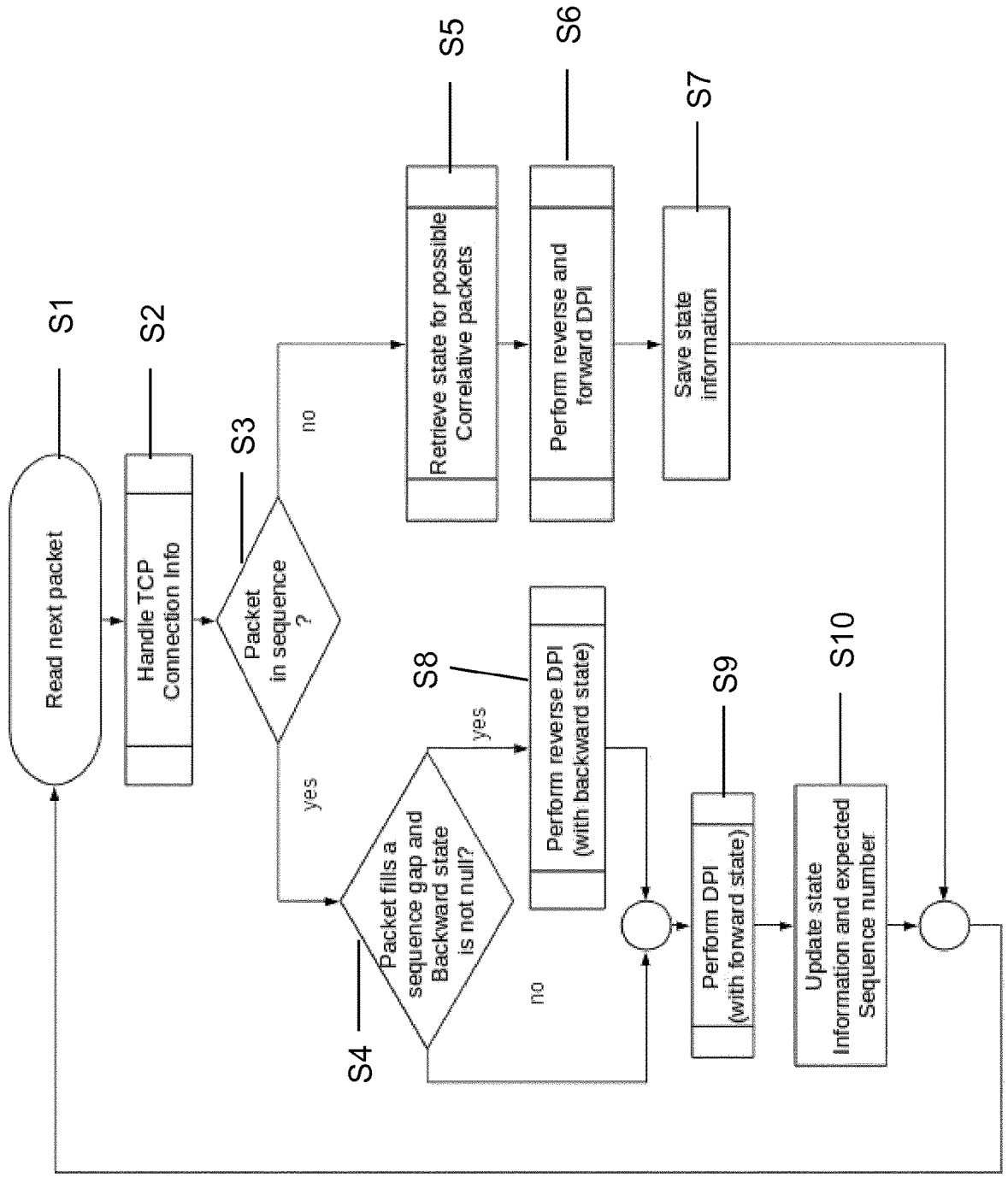
FIG. 3 shows steps of a method according to a further embodiment of the present invention.

The basic operation according to FIGS. 2 and 3 detects signatures that span over more than one packet without reordering using a regular expression engine comprising the steps of: (1) take as input regular expressions (e.g., PCRE-like syntax); (2) Built Deterministic Finite Automata to look for patterns; (3) run over the network packets (payload) to check for match (partial or total).

The first two steps may occur at configuration-time, while the third one may occur at run-time. Here there is no need to wait for collecting packets from the flow, reassemble them and then apply the DPI engine on it. Flow inspection is performed as soon as packets belonging to the flow are received: as long as in-order packets are received the deterministic finite automata, 'DFA', is applied just after reception of each packet starting the analysis of each packet using the DFA state resultant of the analysis of the previous packet. Moreover, when receiving an out of order packet, a new DFA is started and the status/state is saved. Either the partially matching string or a pointer to the state of the DFA can be saved, but also a DFA can be initiated for looking for the reverse signature starting from the end of the packet and saving also this final state. This way, when a packet filling partially or totally the sequence, the DFA is continued to be applied from the front part and the back part finding that way signature at the beginning or the end of the packet.

The DPI engine here can be any of the ones proposed in the Automata theory, such as the Thompson one which can convert a regular expression to Non-deterministic Finite Automata (NFA) and then convert it to a DFA.

FIG. 2 shows a method according to an embodiment of the present invention. FIG. 2 depicts the worst case scenario when the packets P1, P2, P3, P4 arrive out of order, here in order P1, P4, P3, P2. When the first packet P1 arrives, the DFA is applied in forward direction and the forward state is saved at the end. Then, an out of order packet P4 is received. The DFA is applied to this packet P4 both forwards and backwards looking for the reverse signature. The forward and backward state is saved. After that a packet P3 filling the right part of the sequence gap SG arrives. In this case the reverse DFA of the previous step is continued to be applied and the signature is found. When the last packet P2 arrives, it fill the sequence gap SG, the DFA is continued to be applied started in the first step and the signature is found.

To summarize the DFA in forward direction is applied to packets P1, P4 and P2 and the DFA in backward direction is applied to the packets P4 and P3.

FIG. 3 shows steps of a method according to a further embodiment of the present invention. In FIG. 3 a flow chart diagram of the steps for the basic operations is shown. In a first step S1 the next packet is read. In a second step S2 the TCP connection info is handled. In a third step S3 it is checked whether the packet is in sequence or not. If yes, then in a fourth step S4 it is checked whether the packet fills the sequence gap and the backward state is not NULL. If yes, a reverse DPI is performed with a backward state in an eighth step S8. If the packet does not fill a sequence gap or after the eighth step S8 the deep packet inspection with a forward state is performed in a ninth step S9. In a tenth step S10 state information is updated and the expected sequence number is updated. When a packet is not in sequence then in a fifth step S5 the state for possible correlative packets is retrieved. Then in a sixth step S6 a reverse in forward deep packet inspection is performed and in a seventh step S7 a state information is saved. After step S10 or step S7 again step S1 and so on is performed.

Figure 4:
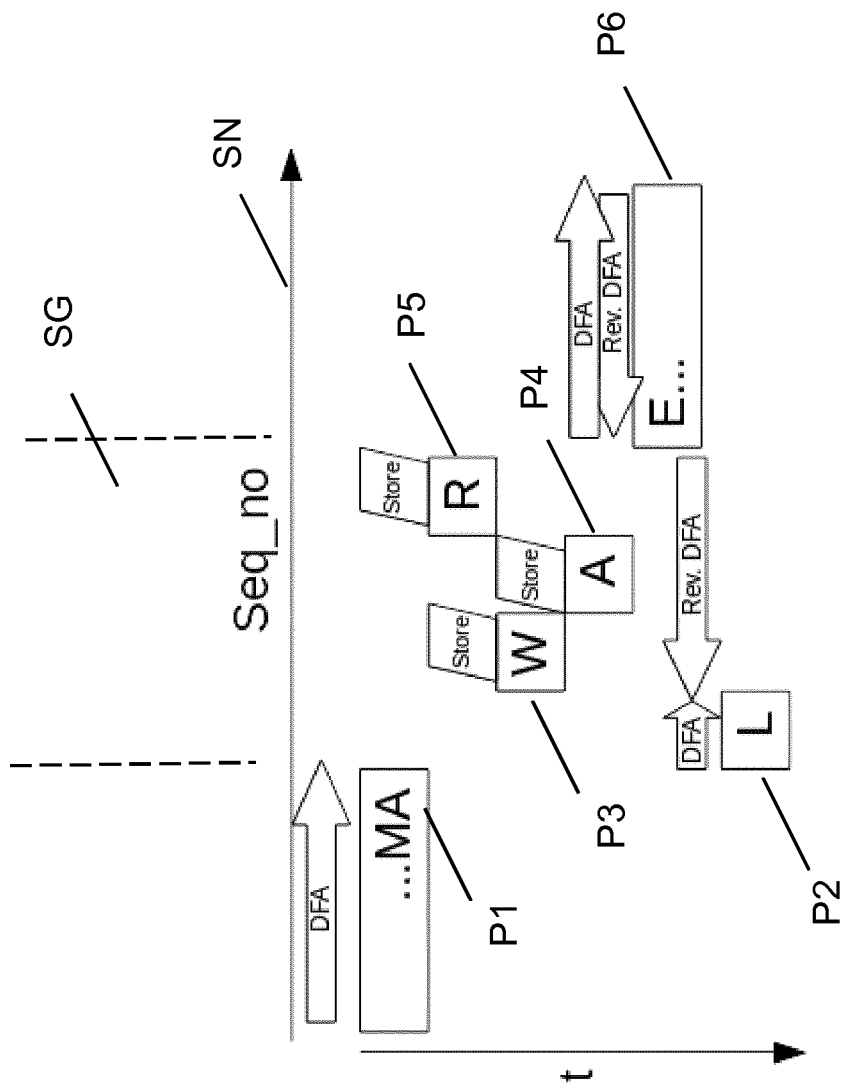
FIG. 4 shows a method according to a further embodiment of the present invention.

FIG. 4 shows steps of a method according to a further embodiment of the present invention. In FIG. 4 the worst case scenario for a complete detection is shown. The basic operation shown in FIGS. 2 and 3 is able to detect signatures that span over 2 packets independently of the order the packets arrive. Moreover, it is also able to detect signatures that span over more than 2 packets in most of the cases. That configuration can be sufficient for some applications.

Other applications, like network intrusion detection, need to ensure the detection in all the possible cases since attackers could use their knowledge of the system to dodge the detection system.

The only case where the basic detection is not able to detect the signature is when this signature span over more than 2 packets and one of the middle packets arrives out of order. To avoid this case all the packets are saved that arrive out of order and can contain a signature. A packet can be in the middle of a signature only if its length is smaller than the signature size. In the case of signatures including a wildcard like the "*" in regular expressions the size of the signature is undefined. In this case a threshold can be defined depending on the application.

The small out of order packets are found and are discarded when their size is bigger than said threshold. Ensuring that way that longest burst of out of order packets will be, in any case, smaller than the defined threshold.

FIG. 4 now depicts the worst case scenario for the complete detection operation. In this case when the first packet P1 arrives in order, the DFA is executed and the forward status/state is saved. Then, three packets P5, P3, P4 out of order and smaller than the signature length are received. The small packets P4, P3, P4 are then stored. When the next packet P6 arrives it is joined with the previous three packets P5, P3, P4 forming a group of packets, i.e. packets P5, P3, P4, P6 longer than the signature length, and the DFA can start both normal and in the reverse way, saving the partial match/state in the reverse operation, i.e. the backward state. Then, the last packet P2 arrives and fills the sequence gap SG. Thus, the DFA that started with the first packet P1 can continue. At the end a partial match of "MAL" starting from the beginning and a partial match of "WARE" starting from the end is obtained. It allows the system to know the signature has been found.

Figure 5:
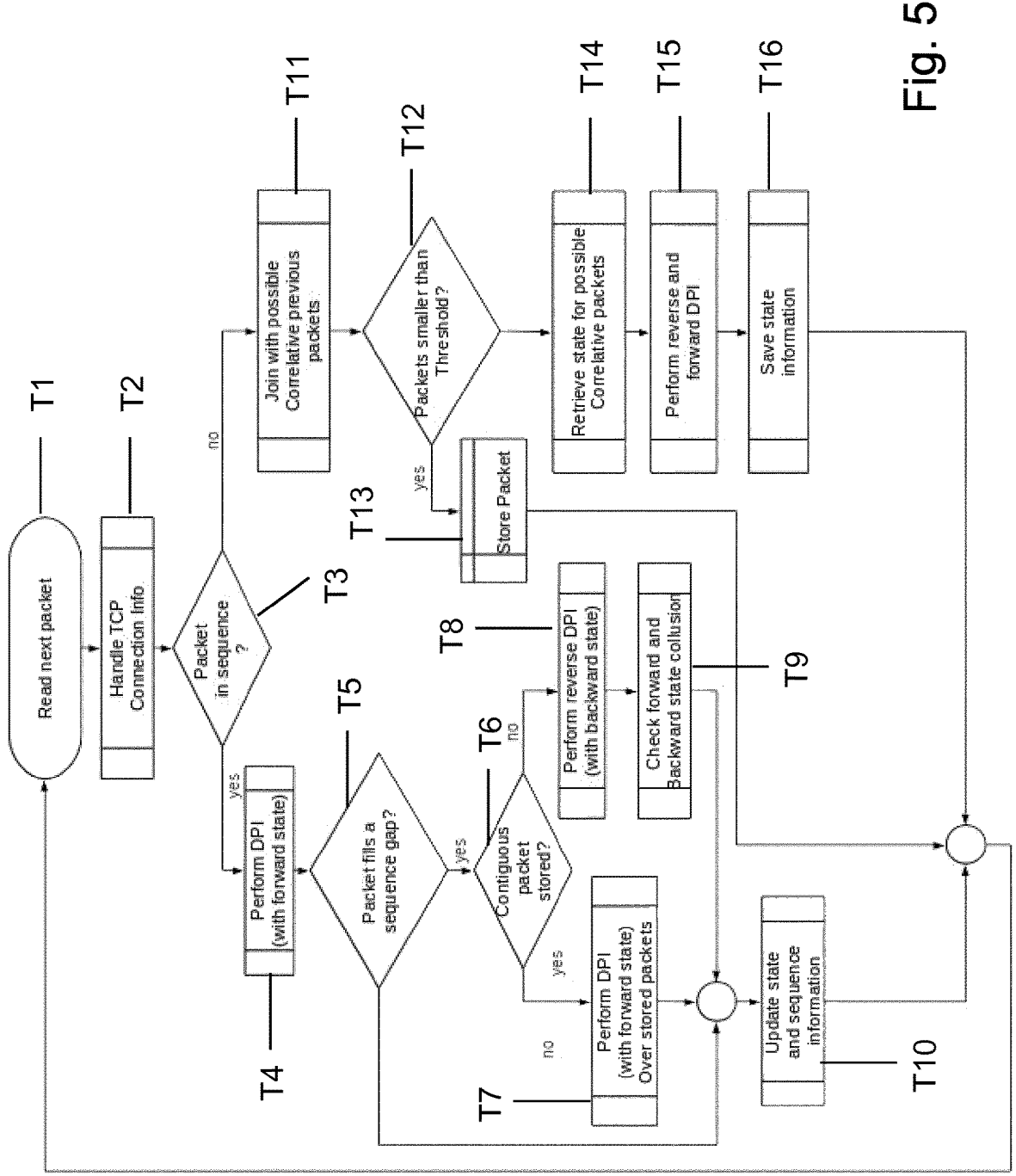
FIG. 5 shows steps of a method according to a further embodiment of the present invention.

FIG. 5 shows steps of a method according to a further embodiment of the present invention. In FIG. 5 a flow chart diagram of the complete detection is shown. In a first step T1 the next packet is read. In a second step T2 TCP connection info is handled. In a third step T3 it is checked whether the packet is in sequence or not. If yes, then in a fourth step T4 deep packet inspection is performed with forward state. Then in a fifth step T5 it is checked whether the packet fills a sequence gap or not. If not, then in a tenth step T10 state and sequence information is updated.

If the packet fills a sequence gap then it is checked whether a contiguous packet is stored in a sixth step T6. If yes a deep packet inspection is performed with forward state over the stored packets and then it is proceeded with step T10. If not, then reverse deep packet inspection with backward state is performed in an eighth step T8 and forward and backward state collusion is checked in a step T9 and then it is proceeded with step T10.

If in step T3 the packet is not in sequence then in an eleventh step T11 possible correlated previous packets are joined. Then in a twelfth step T12 the packets are checked whether they are smaller than a predefined threshold. If yes, then in a thirteenth step T13 said packet is stored. If not then in a fourteenth step T14 the states for possible correlative packets are retrieved. Then in a fifteenth step T15 reverse and forward deep packet inspection is performed and in a sixteenth step T16 the state information is saved. After the step T10, the step T13 or the step T16, it is proceeded again with step T1 and so on.

One or more embodiments of the present invention enable or provide: (1) the execution of DFA backwards in out-of-order packets to avoid storing them and detect the signature in the reverse direction; (2) the storing of partial DFA states so the analysis can be continued when more packets are received; (3) the storage and merging of out-of-order packets smaller than the signature to ensure the detection of all the possible cases.

In particular, one or more embodiments of the present invention provide: (1) the use of partial DFA (Deterministic Finite Automata) status/state to be able to analyze packets when they arrive; (2) the use of reverse DFAs to detect signatures in out of order packets without storing them.

Embodiments of the present invention scale better in terms of computational resources and memory consumption as opposed to conventional mechanisms, methods and systems. As a consequence embodiments of the present invention allow to inspect a much larger number of flows estimated to be in the range of 2 to 3 orders of magnitude.

Further embodiments of the present invention are flexible in terms of performing deep packet inspection: Embodiments of the present invention can use whatever automata work best and use said automata for example in its deep packet inspection engine.

Embodiments of the present invention are designed to reduce the memory footprint in deep flow inspection and may perform deep packet inspection based analysis on consecutive packets within the same flow and thus allowing a per-flow inspection rather than a packet inspection without prior reassembling the flow without keeping a state for every flow under analysis.

Embodiments of the present invention therefore do not need to reconstruct each flow and therefore minimize in that way the amount of memory needed. By applying partial deep packet inspection over packets when they arrive only a small fraction of the out of order packets are saved.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of deep packet inspection for data flowing through a network performed in a memory available to a computational device, the method comprising:
   receiving a first packet comprising a first sequence number;
   applying both a forward finite automaton (FA) and a reverse FA to the first packet, wherein (a) the forward FA is configured to identify signatures spanning multiple packets in a forward direction by traversing the multiple packets in the forward direction and (b) the reverse FA is configured to identify signatures spanning multiple packets in the forward direction by traversing the multiple packets in the opposite reverse direction, wherein the first packet causes the forward FA to assume a first forward state and the reverse FA to assume a first reverse state;
   receiving a second packet having a second sequence number, the second sequence number preceding the first sequence number of the first packet such that (a) the first packet is in the forward direction from the second packet and (b) the second packet is in the reverse direction from the first packet; and
   based on determining that the second sequence number precedes the first sequence number, applying the reverse FA, in the first reverse state, to the second packet.

2. The method according to claim 1, wherein upon receiving an out-of sequence packet and if a size of the packet is smaller than a predefined threshold, the received out-of sequence packet is stored without the forward FA and without the reverse FA being applied to the out-of-sequence packet.

3. The method according to claim 2, wherein the stored packet is joined with other previously stored packets upon matching a correlation parameter.

4. The method according to claim 2, wherein upon receiving an in-order packet, former stored packets are checked for being contiguous with the received in-order packet and if contiguity is found, the forward FA is applied over the one or more previously stored contiguous parts.

5. The method according to claim 4, wherein if no contiguous packet is stored, forward and backward state collusion is checked.

6. A non-transitory computer-readable medium comprising code for causing one or more processors, alone or in combination, to perform the method of claim 1.

7. The method according to claim 1, wherein finite automata are each a respective deterministic finite automaton.

8. The method according to claim 1, wherein a signature is provided in form of regular expressions.

9. The method according to claim 8, wherein the regular expression is converted to a non-deterministic finite automaton and then to a deterministic finite automaton.

10. The method according to claim 1, wherein the application of the reverse FA, in the first reverse state, to the second packet, identifies a signature extending in the forward direction, from the second packet to the first packet.

11. The method according to claim 1, further comprising:
   receiving a third data packet having a third sequence number;
   based on determining that the third sequence number proceeds the first sequence number, applying the forward FA, in the first forward state, to the third data packet.

12. The method according to claim 11, further comprising:
   based on determining that the second sequence number precedes the first sequence number, declining to apply the forward FA, in the first forward state, to the second data packet.

13. The method according to claim 1, further comprising:
   receiving a third data packet having a third sequence number, a fourth data packet having a fourth sequence number, and a fifth data packet having a fifth sequence number, wherein the third sequence number precedes the fourth sequence number, which precedes the fifth sequence number, wherein the fourth data packet is received after both the third and fifth data packets;

applying the forward FA to the third data packet, wherein the third data packet causes the forward FA to assume a third forward state;

applying the reverse FA to the fifth data packet, wherein the fifth data packet causes the reverse FA to assume a fifth reverse state;

applying, to the fourth data packet (a) the forward FA, in the third forward state and (b) the reverse FA, in the fifth reverse state.

14. A non-transitory computer-readable medium comprising code for causing one or more processors, alone or in combination, to perform the method of claim 1.

15. A system comprising circuitry, the circuitry comprising one or more processors configured, alone or in combination, to provide for performance of a method of deep packet inspection for data flowing through a network, wherein the method comprises:

receiving a first packet comprising a first sequence number;

applying both a forward finite automaton (FA) and a reverse FA to the first packet, wherein (a) the forward FA is configured to identify signatures spanning multiple packets in a forward direction by traversing the multiple packets in the forward direction and (b) the reverse FA is configured to identify signatures spanning multiple packets in the forward direction by traversing the multiple packets in the opposite reverse direction, wherein the first packet causes the forward FA to assume a first forward state and the reverse FA to assume a first reverse state;

receiving a second packet having a second sequence number, the second sequence number preceding the first sequence number of the first packet such that (a) the first packet is in the forward direction from the second packet and (b) the second packet is in the reverse direction from the first packet; and based on determining that the second sequence number precedes the first sequence number, applying the reverse FA, in the first reverse state, to the second packet.

16. The system according to claim 15, wherein the method, which the one or more processors are configured to provide for performance of, comprises:

receiving a third data packet having a third sequence number, a fourth data packet having a fourth sequence number, and a fifth data packet having a fifth sequence number, wherein the third sequence number precedes the fourth sequence number, which precedes the fifth sequence number, wherein the fourth data packet is received after both the third and fifth data packets;

applying the forward FA to the third data packet, wherein the third data packet causes the forward FA to assume a third forward state;

applying the reverse FA to the fifth data packet, wherein the fifth data packet causes the reverse FA to assume a fifth reverse state;

applying, to the fourth data packet (a) the forward FA, in the third forward state and (b) the reverse FA, in the fifth reverse state.

* * * * *